United States Patent
Oonishi et al.

(10) Patent No.: US 6,596,164 B2
(45) Date of Patent: Jul. 22, 2003

(54) ROTARY FLAT MEMBRANE SEPARATION APPARATUS

(75) Inventors: Makoto Oonishi, Chiyoda-ku (JP); Naoki Ohkuma, Chiyoda-ku (JP); Yukio Murai, Chiyoda-ku (JP); Yutaka Okuno, Chiyoda-ku (JP)

(73) Assignee: Hitachi Plan Engineering & Construction Co., Ltd., Tokyo (JP)

( * ) Notice: Subject to any disclaimer, the term of this patent is extended or adjusted under 35 U.S.C. 154(b) by 107 days.

(21) Appl. No.: 09/788,604

(22) Filed: Feb. 21, 2001

(65) Prior Publication Data

US 2001/0023844 A1 Sep. 27, 2001

(51) Int. Cl.⁷ .................... B01D 63/16; B01D 63/08
(52) U.S. Cl. .............. 210/321.67; 210/321.68; 210/323.1; 210/324; 210/329; 210/330; 210/359
(58) Field of Search ............... 210/321.67, 321.68, 210/323.1, 324, 329, 330, 359

(56) References Cited

U.S. PATENT DOCUMENTS 5,275,725 A    1/1994  Ishii et al.

FOREIGN PATENT DOCUMENTS

| JP | Y2 5-34747 | 9/1993 |
| JP | 8-309160 | 11/1996 |
| JP | 11-216490 | 8/1999 |
| JP | 2000-107572 | 4/2000 |
| JP | 2000-107784 | 4/2000 |
| JP | 2000-300968 | 10/2000 |
| JP | 2001-87780 | 4/2001 |

*Primary Examiner*—John Kim
(74) *Attorney, Agent, or Firm*—Oliff & Berridge, PLC

(57) ABSTRACT

The rotary flat membrane separation apparatus comprises: a plurality of hollow rotary shafts; a plurality of rotary flat membrane disks mounted on each of the plurality of hollow rotary shafts at regular intervals, the plurality of rotary flat membrane disks mounted on adjacent two of the plurality of hollow rotary shafts being alternately arranged side by side in equal intervals; and a plurality of collars, each of the plurality of collars being arranged between adjacent two of the plurality of rotary flat membrane disks mounted on each of the plurality of hollow rotary shafts. The apparatus is characterized in that a diameter of the collars is between 0.18–0.34 times a diameter of the rotary flat membrane disks. Thus, the effective membrane area can be as large as possible while preventing the vibration of the rotary flat membrane disks caused by the rotation.

1 Claim, 2 Drawing Sheets

F I G. 1
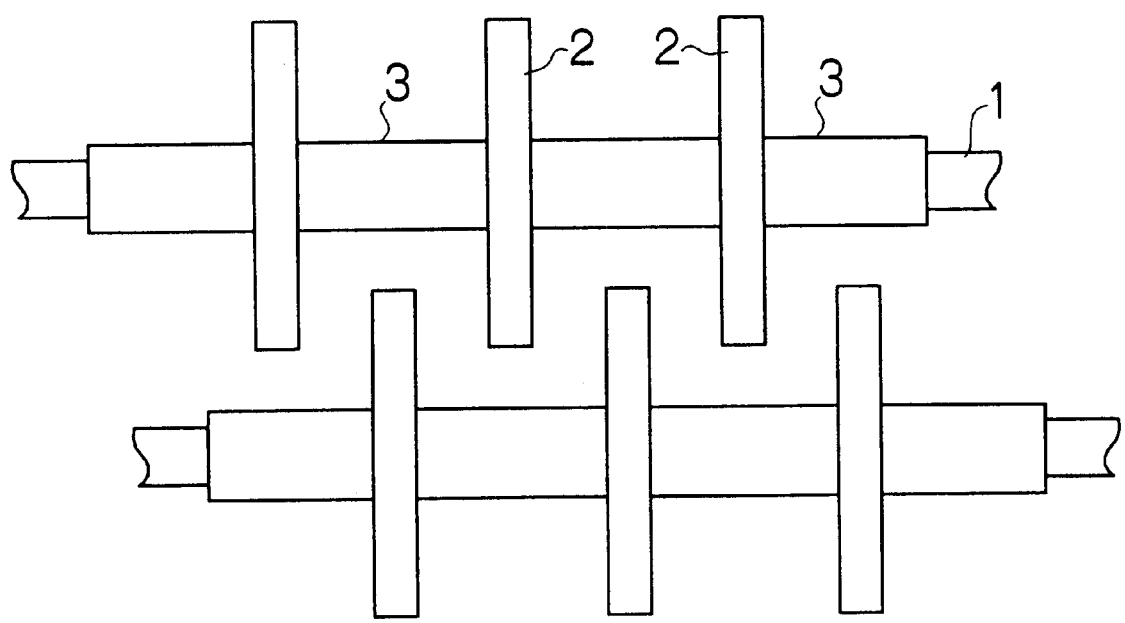

ROTARY FLAT MEMBRANE SEPARATION APPARATUS

BACKGROUND OF THE INVENTION

1. Field of the Invention

The present invention relates to a water treatment apparatus, specifically to a rotary flat membrane separation apparatus which is installed in a water treatment system.

2. Description of Related Art

Many membrane separation apparatuses have been applied to practical use as a solid-liquid separation apparatus in the field of water treatment. Among the membrane separation apparatuses, there are a variety of module forms such as a hollow-fiber module, a spiral module, and a flat membrane module, and each module form is applied for its suitable use. A rotary flat membrane module comprises a hollow rotary shaft and rotary flat membrane disks mounted on the rotary shaft and performs filtration while rotating the flat membrane disks. Since the rotary flat membrane module can provide a flux over a membrane surface by rotating the flat membrane disks to prevent a contamination layer from accumulating on the membrane surface, the rotary flat membrane module has an advantage in that it can be operated with a low amount of power, and thus differs from other membrane modules that provide the flux over the membrane surface by circulating subject liquid to be filtrated.

The rotary flat membrane module has a plurality of rotary flat membrane disks mounted on the rotary shaft, and performs filtration while rotating the rotary flat membrane disks. The conventional rotary flat membrane separation apparatus had a problem in that the subject liquid (liquid to be filtrated) between a pair of adjacent rotary flat membranes rotates together with the rotary flat membrane disks as the rotation speed increases, and the flux over the rotary membrane surface cannot be obtained. In order to solve this problem, Japanese Utility Model No. 2023154 suggests a structure in which rotary flat membrane disks mounted on a pair of adjacent rotary shafts are alternately arranged side by side. In this structure, the rotary flat membrane disks mounted on one of the pair of the rotary shafts act as interrupter against the disks mounted on the other of the pair of the rotary shafts, so that the liquid can be prevented from rotating together with the rotary flat membrane disks.

In order to maintain a distance between the adjacent rotary flat membrane disks mounted on the same rotary shaft, a collar is provided between the adjacent rotary flat membrane disks. The diameter of the collar affects the effective membrane area of the rotary flat membrane disks as well as vibration caused by the rotation of the rotary flat membrane disks. In other words, the smaller the diameter of the collar, the larger the effective membrane are of the rotary flat membrane disks, but the rotation rate at filtration cannot be set higher due to the fact that the vibration caused by the rotation of the rotary flat membrane disks becomes larger. Therefore, the adhesion of the contamination layer on the membrane surface progresses, and the flux is small. If the rotation rate is set at a high speed under this state, the rotary flat membrane disks mounted on the adjacent rotary shafts might collide to each other and break. Conversely, the larger the diameter of the collar, the less the vibration caused by the rotation of the rotary flat membrane disks, but the effective membrane area of the rotary flat membrane disks is smaller and a process amount per disk is thus smaller.

SUMMARY OF THE INVENTION

The present invention has been developed in view of the above-described circumstances, and has as its object the provision of a rotary flat membrane separation apparatus which overcomes the above-described problems in the conventional technology and which can obtain the effective membrane area as large as possible while preventing the vibration caused by the rotation of the rotary flat membrane disk.

The present invention is established by knowledge that the above-described objects are achieved by setting the ratio between the diameter of the collar and the diameter of the rotary flat membrane disk to be optimum. The present invention is directed to a rotary flat membrane separation apparatus, comprising: a plurality of hollow rotary shafts; a plurality of rotary flat membrane disks mounted on each of the plurality of hollow rotary shafts at regular intervals, the plurality of rotary flat membrane disks mounted on adjacent two of the plurality of hollow rotary shafts being alternately arranged side by side in equal intervals; and a plurality of collars, each of the plurality of collars being arranged between adjacent two of the plurality of rotary flat membrane disks mounted on each of the plurality of hollow rotary shafts, wherein a diameter of the collars is between 0.18–0.34 times a diameter of the rotary flat membrane disks.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is an explanatory view of an embodiment for a rotary flat membrane separation apparatus of the present invention.

DETAILED DESCRIPTION OF THE PREFERRED EMBODIMENT

Figure 2:
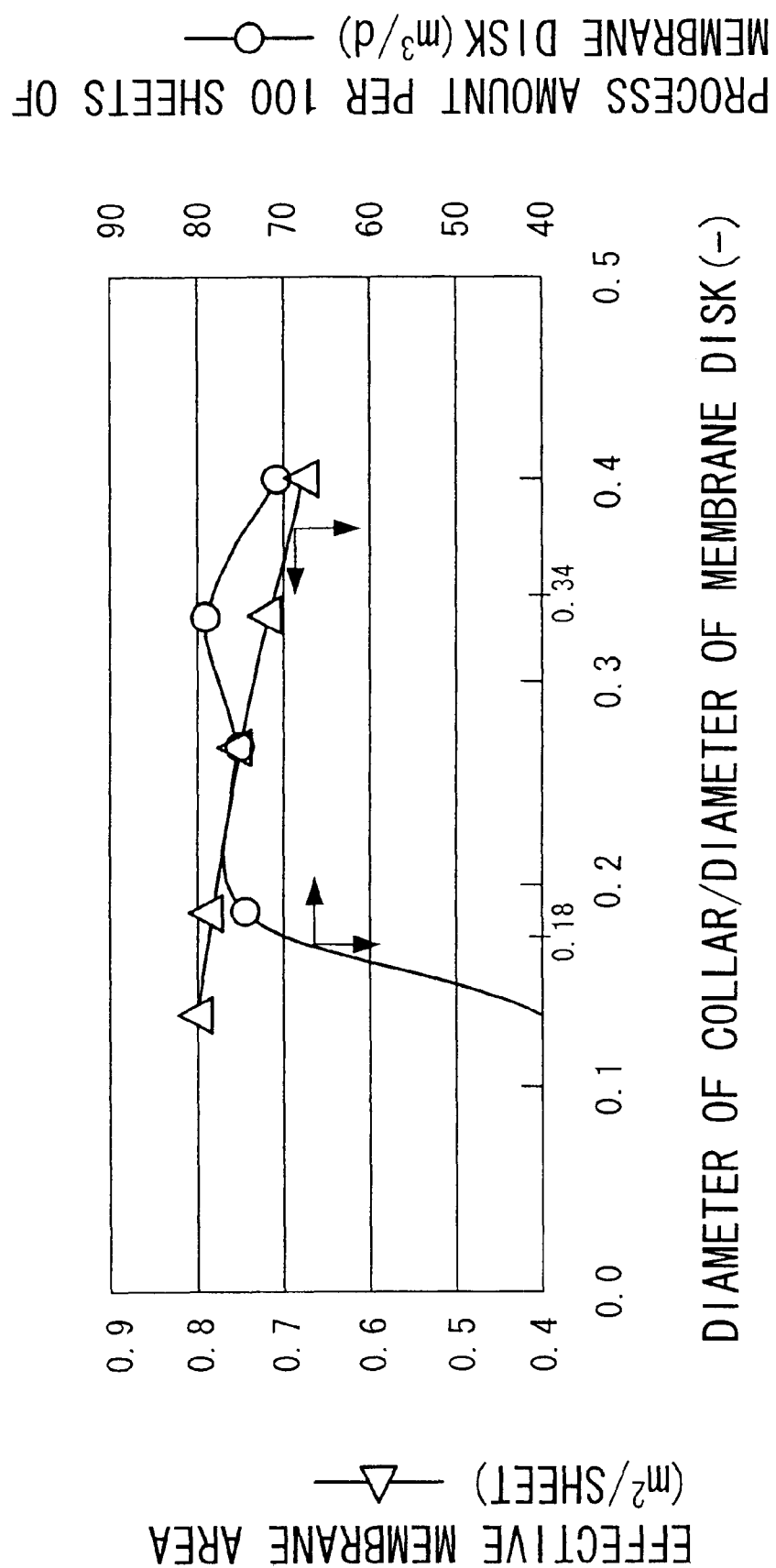
FIG. 2 is a graph showing a relationship involving a ratio of a diameter of a collar and a diameter of a rotary flat membrane disk, an effective membrane area, and a process amount of the rotary flat membrane separation apparatus.

Hereunder a preferred embodiment of the rotary flat membrane separation apparatus of the present invention will be described in detail in accordance with the accompanied drawings.

FIG. 1 is an explanatory view of an embodiment for the rotary flat membrane separation apparatus according to the present invention.

In FIG. 1, a diameter of rotary flat membrane disks 2 is 750 mm, a diameter of collars 3 is 200 mm, and an interval between adjacent rotary flat membrane disks 2 that are respectively mounted on adjacent hollow rotary shafts 1 is 17 mm.

FIG. 2 shows a relationship of a ratio between the diameter of the collar and the diameter of the rotary flat membrane disk, an effective membrane area, and a process amount of the rotary flat membrane separation apparatus. In FIG. 2, a flux is measured, and the effective membrane area and the process amount per 100 sheets of the rotary flat membrane disks are indicated in a state where the diameter of the rotary flat membrane disk is 750 mm, the diameter of the collar is changed between 100–300 mm, and the apparatus is operated by a maximum rotation rate at which the rotary flat membrane disks mounted on the adjacent rotary shafts do not collide to each other.

When the ratio between the diameter of the collar and the diameter of the rotary flat membrane disk is less than 0.18, the vibration of the rotary flat membrane disk is severe, although the effective membrane area can be large. Hence, the filtration must be operated under a low rotation rate; thus, the flux is thus low after all, and the process amount is small in this case as a result. In another case when the ratio between the diameter of the collar and the diameter of the rotary flat membrane disk is more than 0.34, although the vibration of the rotary flat membrane disk can be small and at the same time the flux is large since the filtration can be operated by setting the rotation rate at a high value, yet collecting resistance of the filtrated water is large due to increase of the centrifugal force of the rotation and besides the effective membrane area is small, and the process amount is small as a result. Consequently, the process amount per apparatus can be the largest by setting the ratio between the diameters of the collar and the rotary flat membrane disk to be between 0.18–0.34.

Material of the membrane for the rotary flat membrane disk which is used in the present invention has no particular limitation. Such material may be of an organic group such as polysulfone and polyolefin, or may also be of inorganic group such as metal. Material of the support board for the rotary flat membrane disk has no particular limitation, either. Such material may be of organic group such as epoxy group and vinyl chloride group, or may also be metal such as stainless steel.

As described above, the rotary flat membrane separation apparatus which is constructed in accordance with the present invention can obtain the effective membrane area as large as possible while suppressing the vibration caused by the rotation of the rotary flat membrane disk. Therefore, the rotary flat membrane disks mounted on the adjacent rotary shafts do not become in contact with each other or break, and further, the process amount per apparatus can be improved to be larger.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A rotary flat membrane separation apparatus, comprising:

a plurality of hollow rotary shafts;

a plurality of rotary flat membrane disks mounted on each of the plurality of hollow rotary shafts at regular intervals, the plurality of rotary flat membrane disks mounted on adjacent two of the plurality of hollow rotary shafts being alternately arranged side by side in equal intervals; and a plurality of collars, each of the plurality of collars being arranged between adjacent two of the plurality of rotary flat membrane disks mounted on each of the plurality of hollow rotary shafts, wherein a diameter of the collars is between 0.18–0.34 times a diameter of the rotary flat membrane disks.

* * * * *